(12) United States Patent
Denz

(10) Patent No.: US 7,156,063 B2
(45) Date of Patent: Jan. 2, 2007

(54) STARTER DEVICE FOR AN INTERNAL COMBUSTION ENGINE AS WELL AS A METHOD FOR STARTING AN INTERNAL COMBUSTION ENGINE

(75) Inventor: Helmut Denz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 106 days.

(21) Appl. No.: 10/507,462

(22) PCT Filed: Feb. 20, 2003

(86) PCT No.: PCT/DE03/00524

§ 371 (c)(1),
(2), (4) Date: Mar. 9, 2005

(87) PCT Pub. No.: WO03/081026

PCT Pub. Date: Oct. 2, 2003

(65) Prior Publication Data

US 2005/0139181 A1 Jun. 30, 2005

(30) Foreign Application Priority Data

Mar. 21, 2002 (DE) .............................. 102 12 510
Aug. 27, 2002 (DE) .............................. 102 39 150

(51) Int. Cl.
*F02N 11/08* (2006.01)
(52) U.S. Cl. ................... 123/179.3; 290/38 R
(58) Field of Classification Search ............. 123/179.3, 123/179.2, 179.4, 198 D; 290/38 E, 38 R
See application file for complete search history.

(56) References Cited

U.S. PATENT DOCUMENTS 3,675,033 A * 7/1972 Richard et al. ........... 290/38 R
4,031,403 A * 6/1977 Hill .......................... 290/38 R
6,104,157 A * 8/2000 Kramer et al. .............. 318/445
6,531,837 B1 * 3/2003 Forstl et al. ................ 318/139

FOREIGN PATENT DOCUMENTS

DE 195 32 484 8/1996

(Continued)

OTHER PUBLICATIONS

Patent Abstracts of Japan, vol. 017, No. 701 (M-1533), Dec. 21, 1993.
Patent Abstracts of Japan, vol. 1997, No. 06, Jun. 30, 1997.

*Primary Examiner*—Stephen K. Cronin
*Assistant Examiner*—Arnold Castro
(74) *Attorney, Agent, or Firm*—Kenyon & Kenyon LLP

(57) ABSTRACT

A starting device for an internal combustion engine includes a switching control device for controlling a starter motor. At least one power switching module connects the starter motor to a voltage source and is activated via an assigned control line. A control electronics is provided for controlling the at least one power switching module. A release device which records the power flow of the internal combustion engine makes available, as a function of the running of the internal combustion engine, a release signal for the release of the activating switching procedure by the at least one control line. The release device includes a first release switching channel that works independently of the control electronics and a second release switching channel that cooperates with control electronics. These are set up in such a way that an initiation of the activating switching procedure takes place only during the simultaneous release switching setting of the two release switching channels. A diagnosis device of the switching control device, at the ending of making available the release signal for the activating switching procedure by the release device, records the release switching setting of the first release switching channel. This makes possible the monitoring of the function of the first release switching channel, which increases the safety of the starting procedure. A method utilizing the components described for starting an internal combustion engine is also described.

33 Claims, 2 Drawing Sheets

FOREIGN PATENT DOCUMENTS

| | | |
|---|---|---|
| DE | 198 11 176 | 4/1999 |
| DE | 198 44 454 | 4/2000 |
| EP | 0 363 933 | 4/1990 |
| JP | 05 240132 | 9/1993 |
| JP | 09 053551 | 2/1997 |

* cited by examiner

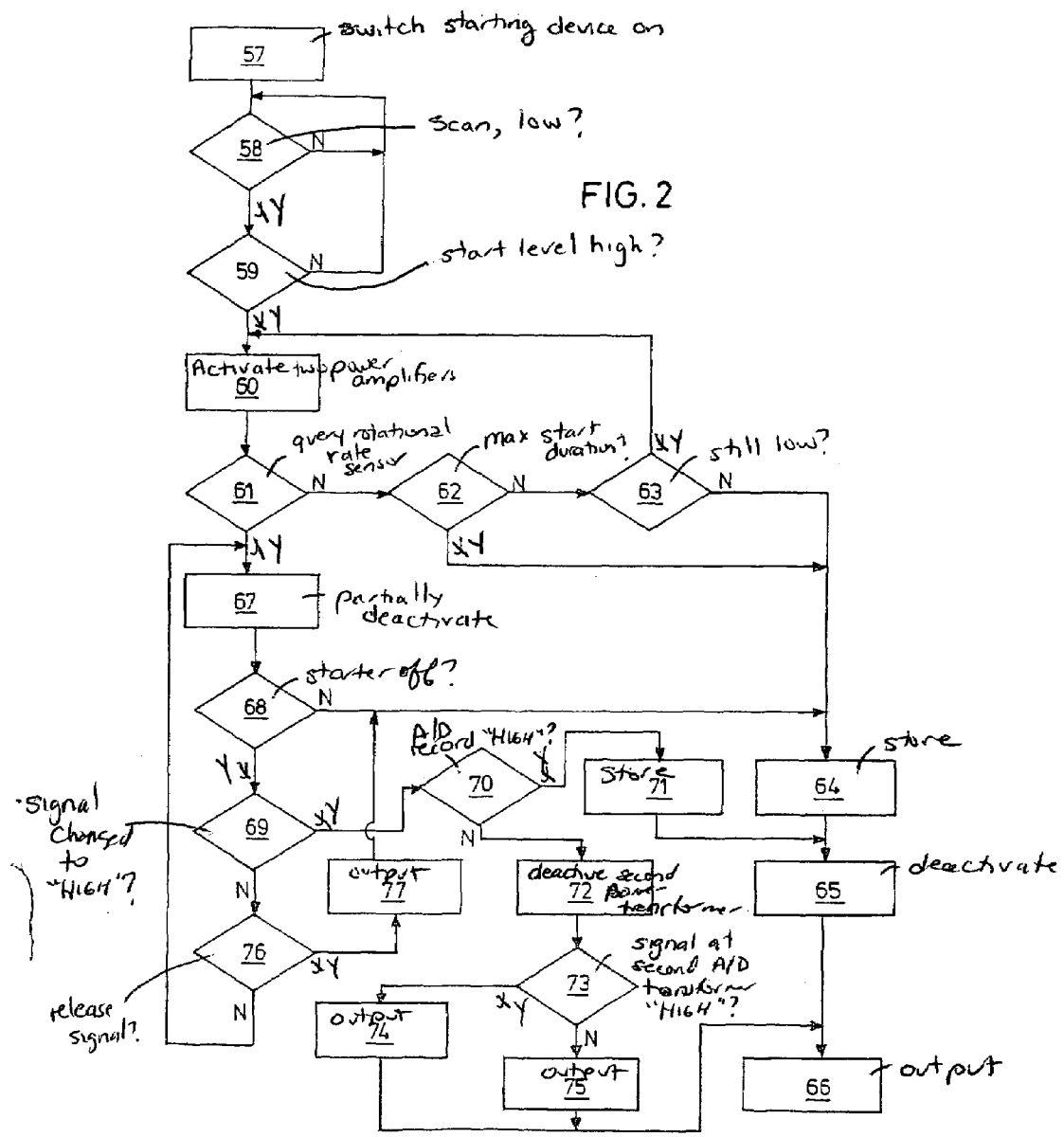

STARTER DEVICE FOR AN INTERNAL COMBUSTION ENGINE AS WELL AS A METHOD FOR STARTING AN INTERNAL COMBUSTION ENGINE

FIELD OF THE INVENTION

The present invention relates to a device and method for starting an internal combustion engine.

BACKGROUND INFORMATION

A starting device and a starting method are described in German Patent Application No. DE 195 32 484. In this device, a method for improving the safety of the starting procedure, the power switch module is designed to be redundant, by providing two power switches in series. The starting device is then able to tolerate certain operating troubles, such as one of the power switches "getting stuck" in a closed switching state. Given the power switch module described in German Patent Application No. DE 195 32 484, even a faulty triggering of one of the power switches, not based on activation by the control electronics, does not lead to an undesired initiation of the starting procedure. The starting device described in German Patent Application No. DE 195 32 484, does not address problems in connection with the malfunctioning of the control electronics in the course of the starting procedure.

German Patent Application No. DE 198 11 176 describes a system and a method for controlling an electrical machine, particularly for controlling an electrical starter for starting an internal combustion engine, having a switching means for producing an electrical connection between a voltage source and the electrical starter, the electrical starter being able to be coupled to a crank mechanism of the internal combustion engine in response to the operation of the switching means, via an engageable transmission. It is also provided that, in the connection between the voltage source and the electrical starter, an electronic control unit shall be situated, via which a voltage and/or a current and/or a turn-on time for the electric starter is controllable.

When starting an internal combustion engine, one should make sure that the control electronics can absolutely not initiate the start as long as the internal combustion engine is not prepared for the start. In the case of an internal combustion engine having a power train and an engine, no start should take place, in particular, when, and as long as, there is a frictional connection between the power train and the engine. Protection against the faulty starting performance of an internal combustion engine does not yet exist in sufficient measure for existing starting devices and starting methods.

SUMMARY

An object of the present invention is to provide a starting device in which operating conditions of the internal combustion engine, in which a start should not take place, are safely detected, whereby an attempt at starting, during such an operating condition, is able to be prevented, and optionally warning the driver is made possible.

A release device is provided which makes sure that the control electronics can only switch the at least one power switch module in response to a release. In an internal combustion engine having an automatic transmission, a release signal may be produced, for example, by a P/N signal in park or neutral position of the transmission selector lever. When it comes to an internal combustion engine having an automatic transmission with an automatic start-stop system, the release signal may also be generated when the transmission selector lever of the automatic transmission is in the driving position and the engine is turned off by the control electronics at a stillstand of the vehicle driven by the internal combustion engine. In the case of an internal combustion engine having a manual transmission, in turn, the release signal may be made available by an interlock switch or by a clutch sensor, for example, by a clutch potentiometer. Using this, it may be detected that the clutch pedal has been fully depressed, and that a frictional connection has been established between the transmission and the engine.

Using a starting procedure which depends on the release signal, the internal combustion engine is safely prevented from being started when an unsuitable operating condition for starting exists, such as when there is a frictional connection between the power train and the engine. In this connection, the release device includes a first and a second release switching channel which have a redundant function. The first release channel is independent of the control electronics, and ensures the functioning of the release device even when there is an error in the control electronics. In this context, by the first release switching channel working independently of the control electronics, an undesired starter activation when there is no release signal, caused by a faulty functioning of the control electronics, is safely prevented. At the same time, an error in the first release channel does not lead to an erroneous start as long as the control electronics work correctly, since then the second release switching channel remains effective. In the course of a normal starting procedure, the functioning of a first release switching channel can be checked via the diagnosis device, so that possibly appearing, dormant component failure, such as a short-circuit to ground, can be safely detected. The functioning of the starting device can be maintained in spite of an error in the first release signal, so that the operation of the internal combustion engine is further possible.

A first release switching channel may be designed in a structurally simple fashion.

A second release switching channel may be implemented by an evaluation program of certain operating condition sensors, that are usually present anyway, by the control electronics.

An A/D transformer may lead to a precise recording of the release switch setting, which in particular may be evaluated by the control electronics.

Using the starting device according to one example embodiment of the present invention, the functioning may be checked of the first release switching channel with respect to the power switch module not deactivated by the control electronics. In response to the correct functioning of the first release switching channel, the power switch module not deactivated by the control electronics is prevented from switching by the first release switching channel, which blocks in this case. When the first release switching channel is not working, this does not lead, in a diagnosis, to an error function of the starting device, because a start is prevented in any case via the power switch module redundantly deactivated by the control electronics.

An alternating deactivation of the power switching modules using an example diagnosis device may lead to a checking of the functioning of the release signals allocated to these power switch modules or of the functioning of the sections of the first release switching channel allocated to these power switch modules.

The deactivation of the power switch modules may be carried out via the diagnosis device according to a specified deactivating sequence. In the case of two power switch modules, the deactivation for subsequent starting procedures may be carried out, for example, in an alternating fashion. In this way it is ensured that indeed the release signals for all power switch modules can be monitored with the aid of the diagnosis device.

A diagnosis device according to an example embodiment of the present invention may make certain that no starting procedure can take place if there is a faulty first release switching channel. In addition, the diagnosis device may be designed in such a way that it also monitors the deactivation, of all power switch modules, that is then initiated by the control electronics, which makes possible, in addition to the diagnosis of the first release switching channel, also a diagnosis of the functioning of the power switch modules.

Because of the redundancy of the two release switching channels, a correct operation of the starting device is still possible even when the first release starting channel has an error. In this case, since the safety of the starting device is reduced, in accordance with an example embodiment of the present invention a warning signal sensor may be activated, so that the error can be detected and rectified.

An error entry in a storage medium according to an example embodiment of the present invention may simplify the error rectification.

A speed sensor according to an example embodiment of the present invention may lead to a certain recording of the power flow of the internal combustion engine, that is, of the presence of a frictional connection between the power train and the engine.

In many internal combustion engines, a plurality of operating parameters is routinely monitored. Among these are, for instance, the presence of an interlock signal, the setting of the transmission selector lever of an automatic transmission, the presence of a frictional connection between the power train and the engine of the internal combustion engine, the rotational speed of the internal combustion engine or the setting of the clutch pedal. These various operating conditions of the operating parameters allocated to the internal combustion engine may be used, according to an example embodiment of the present invention, to increase the safety of the starting procedure of the internal combustion engine, in that, by comparison of the recorded operating parameters, a plausibilization of the individual release signals is carried out.

According to an example embodiment of the present invention, at least one frictional connection sensor, may lead to the certain recording of an operating condition of the internal combustion engine.

It is a further object of the present invention to design as safely as possible a method for starting an internal combustion engine of the type named at the outset.

BRIEF DESCRIPTION OF THE DRAWINGS

In the following, an example embodiment of the present invention is described with reference to the drawings.

FIG. 2 shows a flow chart of a method for starting the internal combustion engine, according to an example embodiment of the present invention.

DETAILED DESCRIPTION OF EXAMPLE EMBODIMENTS

Figure 1:
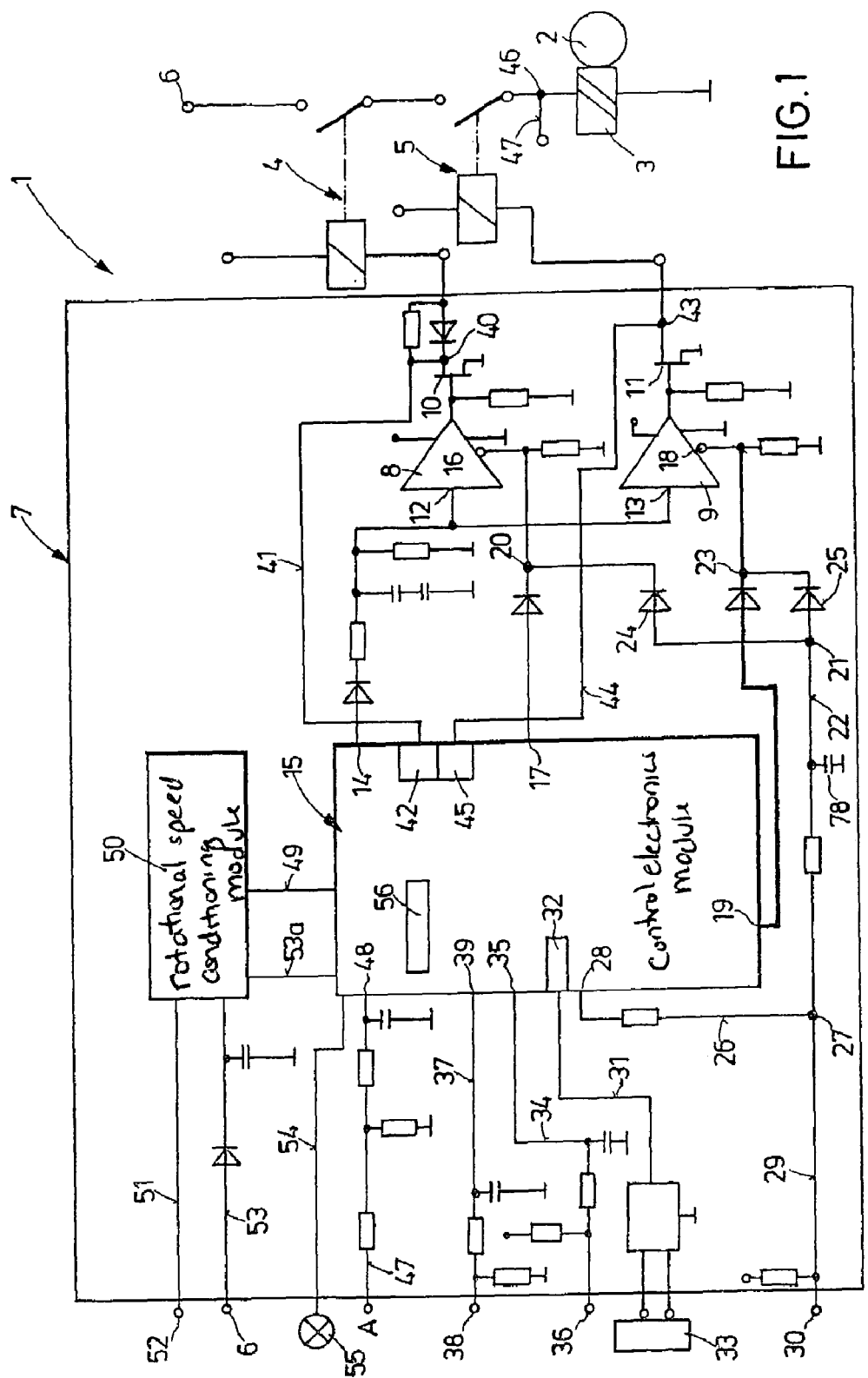
FIG. 1 shows a circuit diagram of a starting device according to an example embodiment of the present invention.

A starting device in FIG. 1, provided overall with reference numeral 1, is used for starting an internal combustion engine, not shown in FIG. 1, via a starter 2, designed as an electric starter motor, and is switched by a magnetic switch 3. The latter is controlled via two starter relays 4, 5 that are connected in series, which in the closed state connect the starter 2 to a voltage source 6. The control of starter relays 4, 5, in turn, takes place over a switching control device denoted overall by reference numeral 7.

As output stages within switching control device 7 for controlling control relays 4, 5, two power amplifiers 8, 9 connected as control circuits are used, having starter output stage transistors 10, 11 as control stages. Input terminals 12, 13 of power amplifier 8, 9 are connected to each other and to an activation output of a control electronics module 15, which has a microcomputer and an internal data storage 56. Between the output of starter output stage transistor 10 and starter relays 4 there is a branch point 40, using which, via a first diagnosis line 41, a first AD transformer 42 of control electronics module 15 is connected. Between the output of starter output stage transistor 11 and starter relays 5 there is a second branch point 43, which, via a second diagnosis line 44, is connected to a second A/D transformer 45 of control electronics module 15. A control terminal 16 of power amplifier 8 is connected to a first deactivating output 17, and a control terminal 18 of power amplifier 9 is connected to a second deactivating output 19 of control electronics module 15.

Via a connecting node 20 between first deactivating output 17 and control terminal 16, a branch node 21 of a hardware release switching channel 22 is connected to first power amplifier 8. Via a second connecting node 23 between second deactivating output 19 and second control terminal 18, branch node 21 is connected to second power amplifier 9. Between branch node 21 and first connecting node 20, a first decoupling diode 24 is situated in the forward direction. Between branch node 21 and second connecting node 23, a second decoupling diode 25 is situated in the forward direction.

Hardware release switching channel 22 is brought together with software release switching channel 26 via a release branch node 27. Between hardware release switching channel 22 and ground, a capacitor 78 is situated. This lies between release branch node 27 and branch node 21. Software release switching channel 26 is situated between release branch node 27 and a release input 28 of control electronics module 15. Joined release switching channels 22, 26 form a main release signal channel 29, by which they are connected to a first release sensor 30. If the internal combustion engine is outfitted with an automatic transmission, release sensor 30 detects whether a transmission selector lever for the automatic transmission is in the P position, i.e., the park setting, or in the N setting, i.e., the neutral setting. If the internal combustion engine having the automatic transmission also has an automatic start-stop system, by which the internal combustion engine is shut off when it is not needed, release sensor 30 detects right at the transmission whether there is a frictional connection between transmission input and engine output. In the case of an internal combustion engine having a manual transmission, release sensor 30 detects the setting of a clutch pedal. In all these variants, release sensor 30 operates in such a way that on main release signal channel 29 there is a release signal, having a "low" signal level, when there is no frictional connection between the internal combustion engine and its power train.

In particular for the case of an automatic transmission, via a first auxiliary release signal channel 31, an auxiliary release input 32 of control electronics module 15 is connected to a transmission control 33, which redundantly to release sensor 30 detects whether a frictional connection exists between the internal combustion engine and its power train. Especially in the case of a manual transmission, via an additional auxiliary release signal channel 34, an additional auxiliary release input 35 of control electronics module 15 is connected to a clutch switch 36 that is, for instance, designed as a potentiometer, which, in the internal combustion engine having a manual transmission, detects an incipient interruption of the frictional connection between the internal combustion engine and its power train, and this is used in control electronics module 15 for travel comfort functions of the internal combustion engine.

A starting line 37 connects a starting operating element 38, e.g., an ignition lock, having a starting input 39 of control electronics module 15.

Via a branch point 46 between starter relay 5 and magnetic switch 3, a magnetic switch diagnosis line 47 is connected to a magnetic switch diagnosis input 48 of control electronics module 15. For the sake of clarity, magnetic switch diagnosis line 47 in FIG. 1 is shown interrupted, via connection A—A.

Control electronics module 15 is connected to a rotational speed conditioning module 50, via a control/data line 49. This is connected via a signal line 51 to a rotational speed sensor 52, and via a supply line 53 to the voltage source 6.

Control electronics module 15 is connected to a warning lamp 55, via an output line 54.

A method for starting the internal combustion engine via starter 2, which includes a diagnosis of the switching of second power amplifier 9 over hardware release switching channel 22 that is dependent upon the release signal on the main release signal channel 29, is explained below in the light of the flow diagram in FIG. 2:

In an initializing step 57, the supply voltage for starting device 1 is switched on.

If the start of the internal combustion engine is to take place, in the case of an internal combustion engine having an automatic transmission, the user must bring the transmission selector level to the P/N position, or in the case of an internal combustion engine having a manual transmission, he must step on the clutch. Because of that, release sensor 30 responds, and the signal on main release signal channel 29 is switched to a release signal having the "low" signal level. Because of the release signal, the two power amplifiers 8, 9 are released via hardware release switching channel 22, branch node 21, decoupling diodes 24, 25, connecting nodes 20, 23 as well as control terminals 16, 18, so that they can be switched by control electronics module 15 via input terminals 12, 13. The decline of the level on main release signal channel 29 to "low" is scanned via release input 28 of control electronics module 15 in scanning step 58. This scan takes place until the signal on main release signal channel 29 is actually "low", i.e., upon a negative result N of scanning step 58, the latter is repeated. When there is a positive result Y to query step 58, a query step 59 takes place, via start input 39, as to whether a start level "high" is present on start line 37. At a negative result N of query step 59, query step 58 is repeated.

When the user operates start operating element 38 and thereby causes a "high" level to be present on start line 37, control electronics module 15, in one activating step 60, activates the two power amplifiers 8, 9, and thereby the two starter output stage transistors 10, 11 and the two starter relays 4, 5, and thus activates starter 2 via magnetic switch 3. This takes place in that the signal level on activating output 14 is set to "high", the deactivating outputs 17, 19 having a signal level "low" at the same time.

The running-up of the internal combustion engine is subsequently carried out by querying rotational rate sensor 52 by control electronics module 15 via control/data line 49, rotational rate conditioning module 50 and signal line 51. This takes place in a query step 61, In case of a negative query result N of query step 61, a query is made in a query step 62, via a time component integrated into start operating element 38, as to whether a certain maximum start duration has been reached. If there is a negative query result N of query step 62, in query step 63 there is a further query of the signal level on release input 28, in that it is tested whether the release signal on software release switching channel 26 still has the signal level "low". At a positive query result J, power amplifiers 8, 9 remain activated, and activating step 60 is continued, and the operation of starter 2 is continued.

At a negative query result N of query step 63, as well as at a positive query result Y of query step 62, it is stored in a storage step 64 in data memory 56 of control electronics module 15 that the internal combustion engine is in an operating state in which no diagnosis of hardware release switching channel 22 is possible. Subsequently, in a deactivating step 65, the two power amplifiers 8, 9 are deactivated by setting to "high" the two deactivating outputs 17, 19, and in an output step 66 the information is stored in data memory 56 that an end to the starting procedure that went wrong has been arrived at. The negative query result N of query step 63 corresponds to the situation in which a frictional connection via main release signal channel 29 has been detected while the internal combustion engine is still starting. In this case, the activation of magnetic switch 3 is in any case broken off or not even begun in the first place via deactivating step 65, independent of hardware release switching channel 22. The entries into data memory 56 from steps 64 and 66 are subsequently passed on from control electronics module 15 to an appropriate output medium, such as an LCD screen (not shown).

At a positive result Y of query step 61, that is, when the internal combustion engine has run up, only first power amplifier 8 is at first switched off by control electronic module 15 in a partial deactivating step 67 by setting to "high" the signal level on first deactivating output 17. The deactivation of first power amplifier 8 leads to an interruption, via starter output stage transistor 10 and starter relay 4, of the connection between voltage source 6 and magnetic switch 3, and thus to switching off starter 2. Now, in a query step 68, it is checked, via magnetic switch diagnosis input 48, whether starter 2 is really switched off. This is so if there is a change in level of magnetic switch diagnosis input 48 from "high" to "low". In this case, the result of query step 68, whether the signal on magnetic switch diagnosis line 47 is "low", is a positive Y. In the case of a negative result N of query step 68, storage step 64 is continued, as described above. In such a case, the error to be stored is present, that starter relay 4 is still switching through, although first deactivating output 17 is set to "high" for corresponding first power amplifier 8.

At a positive result Y of query step 68, in an additional query step 69, it is queried as to whether the signal on release input 28 has changed to a "high" level. This is the case when there is a frictional connection between the internal combustion engine and the power train, that is, in an internal combustion engine having an automatic transmission, the transmission selector lever is shifted from P/N into a gear, or in an internal combustion engine having a manual transmission, when the gear has been inserted, the clutch is let go. For the redundant control of the level change on main release signal channel 29 from "low" to "high" in query step 69, in addition, auxiliary release signal channels 31 and 34 are queried via auxiliary release inputs 32 and 35 of control electronics module 15. For the sake of clarity, these queries are not shown in the flow chart in FIG. 2.

At a positive result Y of query step 69, that is, upon ending the making available of release signal "low" on main release signal channel 29, there is a situation in which, in the case of a functionable hardware release switching channel 22, the latter switches off the still-active second power amplifier 9, in spite of the still-active control via outputs 14, 19 of control electronics module 15. Whether such a switching off has occurred is tested after a positive result Y of query step 69 in a query step 70, in which the query is put as to whether A/D transformer 45 records a "high" level. This would mean that second starter output stage transistor 11 was separately switched off by hardware release switching channel 22 via second power amplifier 9. At a positive query result Y of query step 70, that is, in the case of a "high" level at A/D transformer 45, there takes place in a storage step 71 the entry into data memory 56 that hardware release switching channel 22 is functionable, as far as the control of power amplifier 9 is concerned. In this case, deactivating step 65 follows, as was explained above.

At a negative query result N of query step 70, there is an error, since diagnosis line 44 has "low" levels, even though second power amplifier 9 should have been deactivated via hardware release switching channel 22 and second control terminal 18. At a negative query result N of query step 70 and simultaneously at a confirmation of the ending of making available the release signal via redundant auxiliary release signal channels 31 and 34, there takes place, in a deactivating step 72, a deactivation of second power amplifier 9 by setting to "high" second deactivating output 19 and to "low" activating output 14.

In a subsequent query step 73 a test is made once more as to whether the signal at second A/D transformer 45 has changed from "low" to "high", which would reflect the switching off of second power amplifier 9 via control electronics module 15. In the case of a positive query result Y of query step 73, there is clearly an error in hardware release switching channel 22, since second power amplifier 9 allowed itself to be switched off by deactivating step 72 via control electronics module 15, but the latter was not switched off automatically by hardware release switching channel 22 after the release was ended. Therefore, in this case, in an output step 74, an indication of an error is output into data memory 56, indicating that an error has occurred in hardware release switching channel 22. This error is displayed, on the one hand, on the LCD display, and is made visible, on the other hand, by activating warning light 55 via output line 54. When there is a negative query result N of query step 73, it is certain that second power amplifier 9 has not permitted itself to be switched off via control electronics module 15 nor via hardware release switching channel 22, or there is an error in second A/D transformer 45. The reason for such errors may be an error in the output stage formed by second power amplifier 9 and second starter output stage transistor 11, or a short-circuit to ground. In that case, in an output step 75, a data entry takes place into data memory 56 having the content that the signal recorded by A/D transformer 45 is enduringly "low".

When there is a negative query result N in query step 69, i.e., during a longer lasting "low" level at release input 28, the signal at release input 28 is counter-tested by a query step 76, in which the query is put as to whether the release signal received by the transmission control via auxiliary release input 32, or, in the case of a manual transmission, via the release signal via additional auxiliary release input 35, indicates by a "high" level a frictional connection between the internal combustion engine and its power train. If there is a positive query result Y, i.e., if there is an indicated frictional connection, the information is entered into data memory 56, in an output step 77, that an error is present in the release signal measured in release input 28. This entry is subsequently passed on to the LCD display. Storage step 64 is then continued, as described above.

At a negative query result N of query step 76, i.e., frictional connection that is confirmed by one of auxiliary release inputs 32, 35 but is not present, deactivating step 67 is continued and therewith the system waits until, in query step 69, the signal at release input 28 has changed to a "high" level.

Starting device 1 is dimensioned in such a way that, in the case of a short-circuit of capacitor 78 to ground, in the case of a "high" level at main release signal channel 29, a "high" level at release input 28 is still detected. Consequently, software release switching channel 26 is still active, even when hardware release switching channel 22 is no longer able to function because of short-circuited capacitor 78. Starter 2 may consequently still be activated and warning light 55 may be switched on, as well as a corresponding warning message may be output on the LCD display, by which the user is prompted to carry out servicing on starting device 1. The internal combustion engine may continue to be started and operated in such a case via software release switching channel 26, even if an error is present in hardware release switching channel 22.

In the case of a starting procedure of the internal combustion engine correspondingly following the method sequence according to FIG. 2, in deactivating step 67 there takes place a deactivation not at first of first power amplifier 8, as described above, but of second power amplifier 9. In this case the deactivation of first power amplifier 8 may be tested and diagnosed via the branch of hardware release switching channel 22 that ends in control terminal 16, analogously to what was described above. In this way, during sequential starting procedures, alternatingly for each start, the reach-through of the respective branch, ending in control terminals 16 or 18, of hardware release switching channel 22 to power amplifiers 8 and/or 9, starter output stage transistors 10 and 11, respectively, as well as starter relays 4 and 5, respectively, is tested.

If more than two power amplifiers are provided, whose hardware release is to be tested, the controlled deactivation or non-deactivation of power amplifiers for consecutive starting procedures may take place in a predefined and/or statistical sequence, which is set up by a selection device that is not shown.

An interruption in main release signal channel 29 in the signal path after the branching of software release switching channel 26 before or after branching node 21, or a short-circuit of capacitor 78, which impair the function of hardware release switching channel 22, may be detected by the described diagnosis of hardware release switching channel 23. Such an interruption cannot generally be detected without the described method by a comparison of the release signals at inputs 28, 32 and 35 by control electronics module 15.

What is claimed is:

1. A starting device for an internal combustion engine, having a switching control device for controlling a starter motor, the switching control device comprising:
   at least one power switching module which connects the starter motor to a voltage source, and which is activated via at least one control line assigned to at least one of: i) the at least one power switching module, and, ii) at least one control stage assigned to the at least one power switching module;
   control electronics configured to control the at least one power switching module;
   a release device which records a power flow of the internal combustion engine, and which is configured so that, when there is no frictional connection between the internal combustion engine and a power train assigned to the internal combustion engine, the release device makes available, on a release signal channel, a release signal for releasing an activating switching procedure by the at least one control line, the release device including a first release switching channel working independently of the control electronics, and a second release switching channel working together with the control electronics, the first and second release switching channels being configured so that an initiation of the activating switching procedure takes place only during simultaneous release switching setting of the first and second release switching channels; and
   a diagnosis device which is configured so that, at an ending of making available the release signal for the activating switching procedure by the release device, the diagnosis device records a switching setting representing a release switching setting of the first release switching channel.

2. The starting device as recited in claim 1, wherein the first release switching channel is a hardware release switching channel.

3. The method as recited in claim 1, wherein the second release switching channel is a software release switching channel controlled via a microcomputer of the control electronics.

4. The starting device as recited in claim 1, wherein the diagnosis device includes at least one A/D transformer for recording the release switching setting.

5. The starting device as recited in claim 1, further comprising:
   at least two power switching modules connected in series, the diagnosis device collaborating with the control electronics, and being configured so that, at an ending of making available the release signal for the activating switching procedure, the diagnosis device does not deactivate at least one of the power switching modules via the control electronics, and for the diagnosis of first release switching channel, the diagnosis device records a switching state of at least one of the control line and the at least one control stage, of the not-deactivated power switching module via diagnosis lines of the diagnosis device, the diagnosis device configured so that diagnosis device monitors a switching off of an output of the at least one control stage upon the ending of making available the release signals.

6. The starting device as recited in claim 4, wherein the diagnosis device is part of the control electronics.

7. The starting device as recited in claim 4, wherein the at least one A/D transformer is for recording control of the power modules.

8. The starting device as recited in claim 5, wherein the diagnosis device is configured so that, in response to sequential starter motor controls for the internal combustion engine, at the ending of making available the release signal for the activating switching procedure, in comparison to the preceding starting procedure, in each case the diagnosis device does not deactivate at least one other power switching module.

9. The starting device as recited in claim 6, wherein the diagnosis device includes a selecting device by which a controlled non-deactivation of power switching modules takes place in response to sequential starting motor activations according to a predefined non-deactivating sequence.

10. The starting device as recited in claim 1, wherein the diagnosis device is configured so that, when recording an active switching state on one of the at least one control lines, after the ending of making available the release signal, the diagnosis device initiates a deactivation of all of the at least one power switching modules.

11. The starting device as recited in claim 1, wherein the diagnosis device is configured so that, when recording an active switching state on one of the at least one control lines, after the ending of making available the release signal via the control electronics, the diagnosis device activates a warning signal transmitter.

12. The starting device as recited in claim 11, wherein the warning signal transmitter is a warning light.

13. The starting device as recited in claim 1, wherein the diagnosis device is configured so that, when recording an active switching state on one of the at least one control lines, after the ending of making available the release signal, the diagnosis device induces an entry to be made of a data sequence assigned to an error in a storage medium that can be read out.

14. The starting device as recited in claim 1, further comprising:
   a rotational speed sensor collaborating with the release device for recording running of the internal combustion engine.

15. The starting device as recited in claim 1, wherein the release signal channel is configured so that, as a function of a first operating parameter of the internal combustion engine, the release signal channel makes available the release signal for the release of the activating switching procedure, and wherein the release device further includes an additional release signal channel, which is configured so that, as a function of a second operating parameter of the internal combustion engine, the additional release signal channel makes available an independent release signal which is recorded by the control electronics.

16. The starting device as recited in claim 15, wherein the second operating parameter represents at least one of a running of the internal combustion engine and a functional connection of a transmission for the internal combustion engine.

17. The starting device as recited in claim 15, wherein the release device includes at least one frictional connection sensor configured to record a frictional connection between an engine and a transmission or a power train of the internal combustion engine, as one of the operating parameters.

18. A method for starting an internal combustion engine using a starter motor, in which a switching control device controls the starter motor, the switching control device including at least one power switching module that connects the starter motor to a voltage source, a power switching module configured to be activated at least one of via at least one control line assigned to the at least one power switching module, via at least one control stage assigned to the at least one power switching module, and a control electronics which controls the at least one power switching module, the method comprising:
- recording, by a release device of the switching control device, a power flow of the internal combustion engine;
- making available a release signal for releasing an activating switching procedure by the at least one control line, at a time when there is no frictional connection between the internal combustion engine and a power train assigned to the internal combustion engine;
- switching, by a first release switching channel of the release device, as a function of the release signal, the first release switching channel working independently of the control electronics;
- switching, by a second release switching channel of the release device, as a function of the release signal, the second release switching channel collaborating with the control electronics;
- initiating, by the first and second release switching channels, the activating switching procedure only when there is a simultaneous release switching setting of the first release switching channel and the second release channel; and
- at an ending of making available the release signal for the activating switching procedure by the release device, recording, by a diagnosis device of the switching control device, a switching setting representing a release switching setting of the first release switching channel.

19. The method as recited in claim 18, wherein the diagnosis device records the release switching setting via at least one A/D transformer.

20. The method as recited in claim 18, wherein:
- the at least one power switching module includes at least two power switching modules connected in series;
- the diagnosis device collaborates with the control electronics;
- at the ending of making available the release signal for the activating switching procedure, the diagnosis device does not deactivate at least one of the at least two power switching modules via the control electronics;
- for a diagnosis of first release switching channel, the diagnosis device records the switching state of the at least one of the control line and the control stage of the not-deactivated power switching module via diagnosis lines of the diagnosis device; and
- the diagnosis device monitors a switching off of an output of control stage upon the ending of making available the release signal.

21. The method as recited in claim 20, wherein the diagnosis device, in response to sequential starter motor activations for the internal combustion engine, at the ending of making available the release signal for the activating switching procedure, in each case does not deactivate at least one other power switching module.

22. The method as recited in claim 21, wherein a selection device of the diagnosis device undertakes a controlled non-deactivation of the power switching modules in response to the sequential starting motor activations according to a predefined non-deactivating sequence.

23. The method as recited in claim 18, wherein the diagnosis device initiates a deactivating of all power switching modules in response to the recording of an active switching state after the ending of making available the release signal via the control electronics.

24. The method as recited in claim 18, wherein:
- in response to a recording of an active switching state after the ending of making available the release signal via the control electronics, the diagnosis device activates a warning signal transmitter.

25. The method as recited in claim 24, wherein the warning signal transmitter is a warning light.

26. The method as recited in claim 18, wherein upon recording an active switching state after the ending of making available the release signal via the control electronics, the diagnosis device stores a data sequence assigned to an the error in a storage medium that collaborates with the control electronics and is able to be read out.

27. The method as recited in claim 18, wherein the release device collaborates with a rotational speed sensor for recording a running of the internal combustion engine.

28. The method as recited in claim 18, wherein the release device includes a release signal channel, which as a function of a first operating parameter of the internal combustion engine, makes available the release signal for the release of the activating switching procedure, and further includes an additional release signal channel, which, as a function of a second operating parameter of the internal combustion engine, makes available an independent second release signal, which is recorded by the control electronics.

29. The method according to claim 28, wherein the first operating parameter represents at least one of a running of the internal combustion engine, and a frictional engagement of a transmission of the internal combustion engine.

30. The method according to claim 28, wherein the first operating parameter represents at least one of a running of the internal combustion engine, and a frictional engagement of a transmission of the internal combustion engine.

31. The method as recited in claim 18, wherein the release device records, as one of the first and second operating parameters, the frictional connection between an engine and a transmission or power train of the internal combustion engine.

32. A starting device for an internal combustion engine, comprising:
- a control device configured to control a starter motor via at least one power module having an assigned control stage, control logic, and a release device, the release device being configured to detect a non-present frictional connection of the internal combustion engine to a transmission and to release via a release switching channel the control of the starter motor via the control electronics, and redundantly release the control of the starter motor via an additional release switching channel that is independent of the control electronics;
- a diagnosis device configured in such a way that a function of the release switching channel that is independent of the control electronics is tested in such a way that, upon departure of a release signal of the release device, the control of a power module is still maintained by the control electronics and an ability of the power module to be switched off is checked in an entire chain of effectiveness via the release switching channel that is independent of the control electronics.

33. A method for starting an internal combustion engine using a starter motor, comprising:
- controlling the starter motor via a switching control device, the control of the starter motor taking place via at least one power module having an assigned control stage and the control logic;

detecting by a release device, a non-present frictional connection of the internal combustion engine to a transmission;

releasing, by the release device via a release switching channel, a control of the starter motor via a control electronics;

redundantly releasing, by the release device, the control of the starter motor via an additional release switching channel that is independent of the control electronics;

checking a function of the release switching channel that is independent of the control electronics;

upon departure of a release signal of the release device, maintaining the control of the power module by the control electronics; and checking an ability to be switched off of the power module in the entire chain of effectiveness via the release switching channel that is independent of the control electronics.

* * * * *